US009274552B2

(12) United States Patent
Ahn et al.

(10) Patent No.: US 9,274,552 B2
(45) Date of Patent: Mar. 1, 2016

(54) MULTIDISPLAY PORTABLE DEVICE

(75) Inventors: Sung-Ho Ahn, Seoul (KR); Ji-Hoon Park, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 397 days.

(21) Appl. No.: 13/279,773

(22) Filed: Oct. 24, 2011

(65) Prior Publication Data
US 2012/0147535 A1 Jun. 14, 2012

(30) Foreign Application Priority Data

Dec. 9, 2010 (KR) .......................... 10-2010-0125874

(51) Int. Cl.
*G06F 1/16* (2006.01)
*E05D 7/00* (2006.01)
*G09G 5/00* (2006.01)

(52) U.S. Cl.
CPC .............. *G06F 1/1616* (2013.01); *G06F 1/162* (2013.01); *G06F 1/1615* (2013.01); *G06F 1/1618* (2013.01); *G06F 1/1641* (2013.01); *G06F 1/1681* (2013.01)

(58) Field of Classification Search
CPC ... G06F 1/1641; G06F 1/1616; G06F 1/1618; G06F 1/1647; G06F 1/1649; G06F 1/1615; G06F 1/162
USPC ............. 361/679.01–679.45, 679.55–679.59; 455/575.1, 575.3; 345/1.1, 1.3, 173, 345/156, 157, 168, 169, 905; 16/221–392
See application file for complete search history.

(56) References Cited

U.S. PATENT DOCUMENTS

| 7,140,074 B2 * | 11/2006 | Han ...................... G06F 1/1681 16/336 |
| 2003/0083761 A1 * | 5/2003 | Jacobs .................. G06F 1/1616 700/94 |
| 2004/0233625 A1 * | 11/2004 | Saitou ................. H04M 1/0214 361/679.02 |
| 2007/0242421 A1 * | 10/2007 | Goschin ................ G06F 1/1616 361/679.27 |
| 2008/0112113 A1 * | 5/2008 | Sawadski ............ H04M 1/0218 361/679.27 |
| 2008/0242359 A1 * | 10/2008 | Seol ...................... G06F 1/1616 455/566 |
| 2009/0070961 A1 * | 3/2009 | Chung .................... E05D 3/122 16/354 |
| 2010/0071159 A1 * | 3/2010 | Myung ................. H04M 1/022 16/303 |
| 2011/0128216 A1 * | 6/2011 | Renwick ............... G06F 1/1618 345/156 |

* cited by examiner

*Primary Examiner* — Nidhi Thaker
(74) *Attorney, Agent, or Firm* — Cha & Reiter, LLC

(57) ABSTRACT

Provided is a portable communication device including a first housing, a second housing rotatably coupled with the first housing, and a hinge portion provided between the first housing and the second housing to stepwise rotate the second housing toward or away from the first housing, in which display units are disposed on inner and outer sides of the first housing and the second housing, respectively, such that the display units on the inner and outer surfaces of the housings may be used independently or in conjunction to provide for larger display screens.

20 Claims, 18 Drawing Sheets

MULTIDISPLAY PORTABLE DEVICE

CLAIM OF PRIORITY

This application, pursuant to 35 USC 119(a), claims priority to, and the benefit of the earlier filing date, to that patent application filed in the Korean Intellectual Property Office on Dec. 9, 2010 and assigned Serial No. 10-2010-0125874, the entire contents of which is incorporated by reference, herein.

BACKGROUND OF THE INVENTION

1. Field of the Invention

The present invention relates to the field of portable devices and more particularly to a hinged operated portable device including a plurality of display units.

2. Description of the Related Art

Generally, "portable communication devices" as the term is used herein refers to devices that allow for a form of communication, while the devices are being carried. Various applications or types of communications may be performed by the portable device. For example, voice communication, short message service, mobile banking, television (TV) watching, on-line game service, and on-demand video service are communications or applications that may be provided to users using portable communication devices.

The portable communication devices may include devices such as a hand-held phone (HHP), a cordless telephone (CT-)2 cellular phone, a digital phone, a personal communications systems (PCS) phone, and a personal digital assistant (PDA) and are sorted into various types according to their appearances. For example, wireless terminals are sorted into a bar type, a flip type, a folder type, a sliding type, and a pop-up type according to their appearances. The above-mentioned portable communication devices always include an antenna apparatus, a data input/output device, and a data transceiver. For the data output device, a display unit is generally used. Recently, some terminals include a touch screen that allow the user to input data by touching a display screen on the display unit However, a display unit of a conventional portable communication device generally has a screen size of about 320× 240 pixels, and such a small screen size of the display unit is too small for a user to comfortably access a public network, such as the Internet, or watch television or operate an on-line game service, or watch a multimedia presentation (e.g., moving or motion pictures)

In addition, the conventional portable communication device needs a separate cradling device that may hold the device in place. Generally, the cradling device allows the user to position the portable device at an angle convenient for viewing. Otherwise, it is inconvenient for the user to see the (display) screen of the display unit that is placed on a desk without a cradling device.

As a result, there is a need for a portable communication device in which a plurality of display units may be used together or positioned to allow convenient viewing of the display screen.

SUMMARY OF THE INVENTION

Accordingly, an aspect of the present invention is to provide a portable communication device in which a plurality of display units, which rotate stepwise by a multi-axis hinge portion, are provided on outer sides and inner sides of a first housing and a second housing, such that a single display unit provided on an outer side or an inner side of the first housing or the second housing is used in a closed state, the display units provided on the outer sides and inner sides of the first housing and the second housing are positioned in parallel to be used as a large-size screen in an open state by rotation, and the respective display units display different screens (for example, a chatting window on a display unit and an Internet window on another display unit).

Another aspect of the present invention is a portable communication device in which a plurality of display units, which rotate stepwise by a multi-axis hinge portion, are provided on outer sides and inner sides of a first housing and a second housing, respectively, such that the first housing and the second housing rotate stepwise to be opened and closed, thereby facilitating viewing on the display units and making the portable communication device available for various purposes such as a frame, a clock, a weather forecast display, etc.

In another aspect of the present invention a portable communication device is disclosed in which a plurality of display units are provided on outer sides and inner sides of a first housing and a second housing, which rotate stepwise by a multi-axis hinge portion, such that a display unit, data input/output devices, a speaker device, a microphone device, a camera module, and a battery pack can be installed in an extra space remaining after installing the plurality of display units in the first housing and the second housing.

In another aspect of the present invention a portable communication device is disclosed in which a plurality of Printed Circuit Boards (PCBs) and a plurality of battery packs can be selectively disposed in one or both of a first housing and a second housing, thereby reducing the thickness of a product and thus contributing to the slimness of the product.

According to an aspect of the present invention, there is provided a portable communication device including a first housing, a second housing rotatably coupled with respect to the first housing, and a hinge portion provided between the first housing and the second housing to stepwise rotate the second housing toward or away from the first housing, in which the content presented on display units disposed on the outer sides of the first housing and the second housing or on the inner sides of the first housing and the second housing may be viewed on both display units as a single image.

According to another aspect of the present invention, there is provided a portable communication device including a first housing including a first display unit and a second display unit selectively provided on an outer side and an inner side of the first housing, a second housing including a third display unit and a fourth display unit selectively provided on an inner side and an outer side of the second housing, and a hinge portion provided between the first housing and the second housing to rotate the second housing toward or away from the first housing, in which the first housing and the second housing, when being in a closed state, show the first display unit and the fourth display unit provided on the outer sides of the first housing and the second housing, respectively, and the first housing and the second housing when being in an open state show the first display unit and the fourth display units, as one larger display on the outer side and, the second display unit and the third display unit provided on the inner side of the first housing and the second housing as one large display unit.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION

Figure 1:
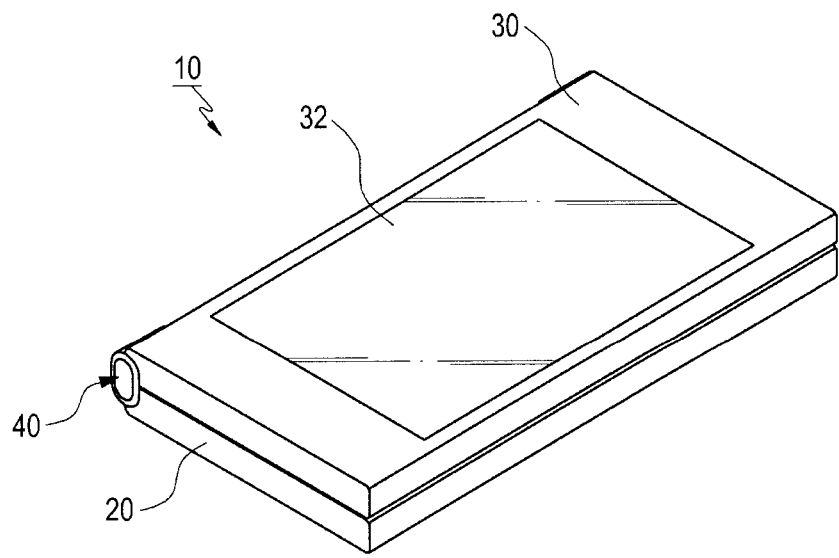
FIG. 1 is a perspective view showing a pre-operation (before-operation) state of a portable communication device according to an exemplary embodiment of the present invention.

Exemplary embodiments of the present invention are described in detail with reference to the accompanying drawings. The embodiments disclosed in the specification and structures shown in the drawings are merely exemplary ones of the present invention, and it should be understood that various variations capable of substituting for the embodiment may exist at the time of filing the application and have been contemplated are within the scope of the invention as recited in the claims.

As shown in FIGS. 1 through 20, a portable communication device 10 includes a first housing 20 (FIG. 1), a second housing 30 (FIG. 1), a first display unit 21 (FIG. 2), a second display unit 22 (FIG. 5), a third display unit 31 (FIG. 5), a fourth display unit 32 (FIG. 1), a hinge portion 40, and input/output devices (not shown). The first display unit 21 and the second display unit 22 are provided on an outer side and an inner side of the first housing 20, respectively. As will the described, the first housing 20 may be opened or closed by stepwise rotation with respect to the second housing 30. The third display unit 31 and the fourth display unit 32 are provided on an inner side and an outer side of the second housing 30, respectively. The second housing 30 may be opened or closed by stepwise rotation with respect to the first housing 20. The hinge portion 40 (FIG. 1) is provided between the first housing 20 and the third housing 30 to allow the second housing 30 to rotate stepwise toward or away from the first housing 20. As would be appreciated, the hinge portion 40 may be positioned along the lateral (FIG. 1) or longitudinal axis (FIG. 2) of the device. In one aspect of the invention, a hinge element 40 may be placed along both the lateral and the longitudinal axis to allow the device to be opened along the lateral and/or the longitudinal axis.

The input/output device(s) (not shown) include at least one of a display unit, a touch screen, a keypad, and a keyboard, but may further include devices other than the foregoing examples, such as a navigation key, QWERTY keys, etc.

At least one of a speaker device, a microphone device, a camera module, and a battery pack (not shown) are disposed in at least one of the first housing 20 and the second housing 30, but components other than the foregoing examples, for example, a touch screen, a keypad, a keyboard, and so forth, may also be disposed in the first housing 20 and/or the second housing 30.

Figure 2:
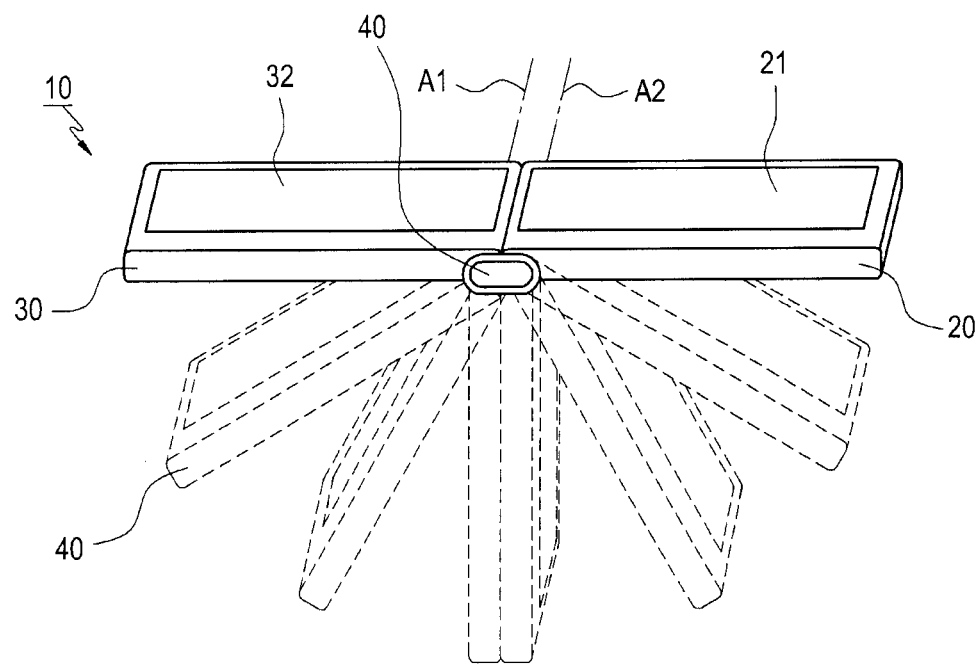
FIG. 2 is a perspective view showing a state in which a first housing and a second housing rotate according to an exemplary embodiment of the present invention.
Figure 3:
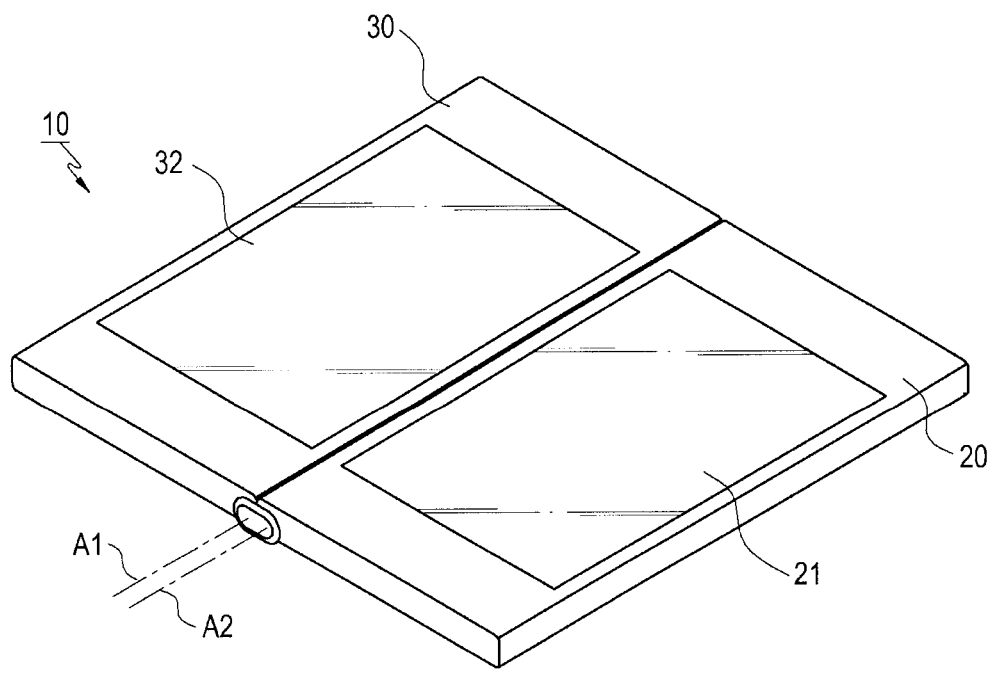
FIG. 3 is a perspective view showing a first display unit wherein a first housing and a second housing are positioned according to an exemplary embodiment of the present invention.
Figure 4:
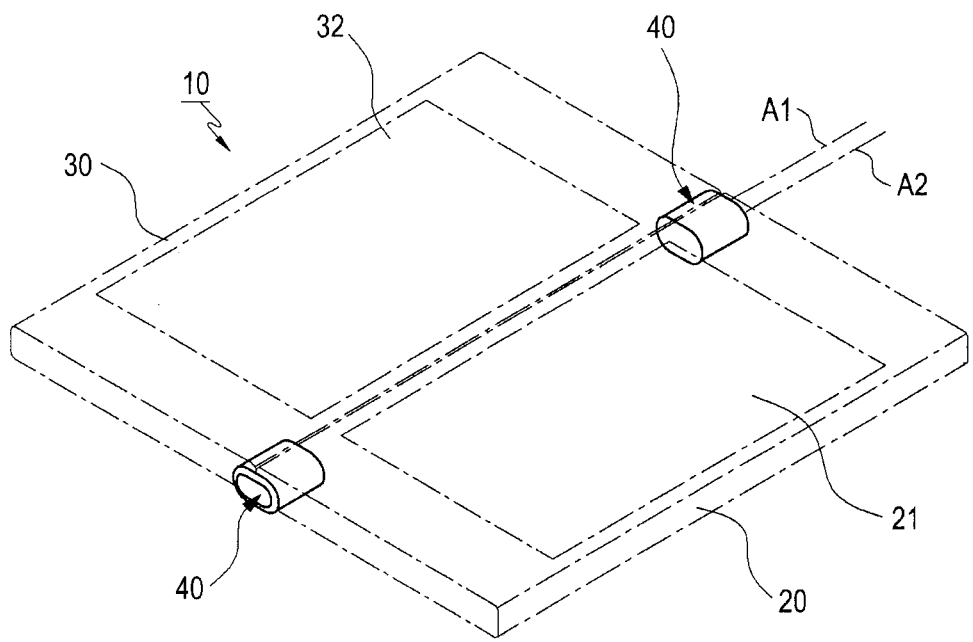
FIG. 4 is a perspective view showing a hinge portion of the first display housing according to an exemplary embodiment of the present invention.

As shown in FIG. 1, the first housing 20 and the second housing 30, when in a closed state show the first display unit 21 and the fourth display unit 32 provided on the outer sides of the first housing 20 and the second housing 30, respectively. In this prospective view, first display unit 21, which is on the outer surface of first housing 20 is facing into the plane of the page, and, hence, is not viewable.

As shown in FIGS. 2 through 5, the first housing 20 and the second housing 30, when opened, by rotation along the hinge, show the first display unit 21, the second display unit 22, the third display unit 31 (FIG. 5), and the fourth display unit 32 (FIG. 5), which are disposed on the outer sides and inner sides of the first housing 20 and the second housing 30.

Figure 6:
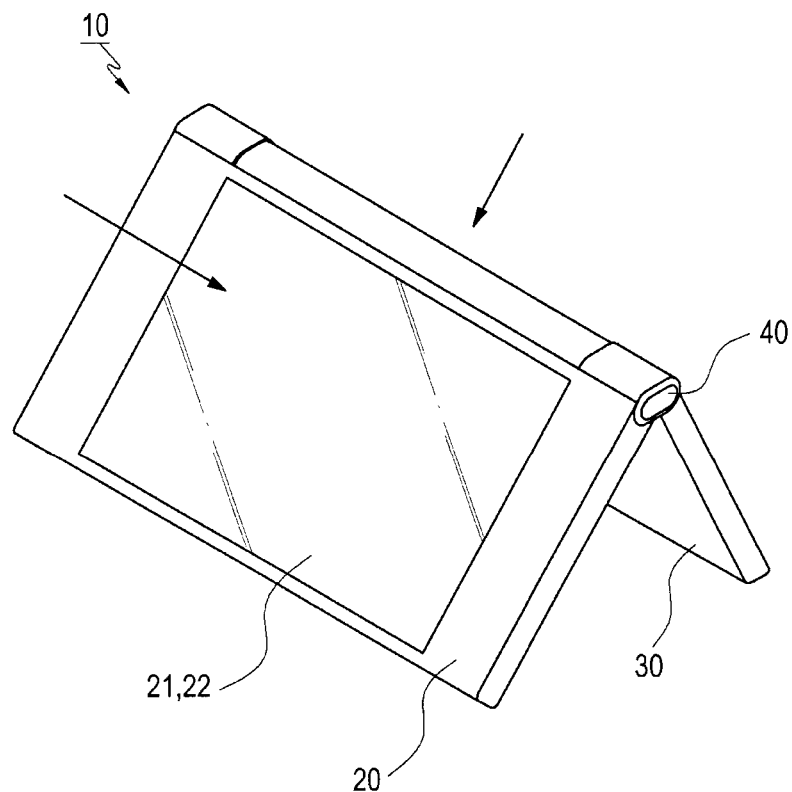
FIG. 6 is a perspective view showing a state wherein a first housing and a second housing of a portable communication device are inclined according to an exemplary embodiment of the present invention.
Figure 7:
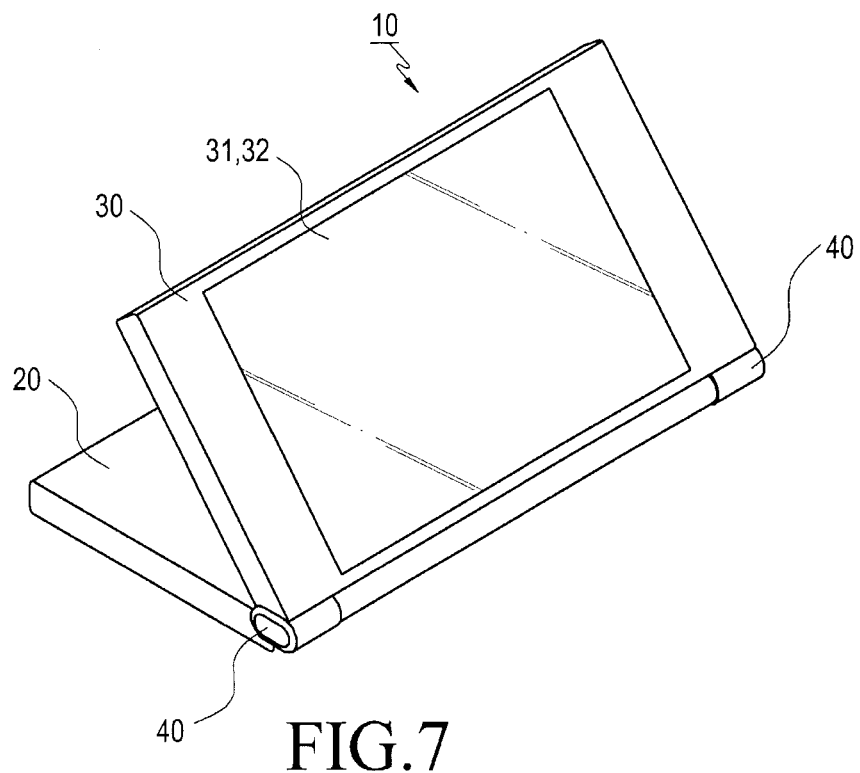
FIG. 7 is a perspective view showing a state where a first housing and a second housing are inclined according to an exemplary embodiment of the present invention.

As shown in FIGS. 6 and 7, the first housing 20 and the second housing 30, when rotated about the hinge element, may be positioned so that the displays are inclined and, thus, selectively show one of the first display unit 21 and the fourth display unit 32 (not visible) provided on the first housing 20 and the second housing 30 and the second display unit 22 and the third display unit 31 (not visible) provided on the first housing 20 and the second housing 30.

In one exemplary embodiment, as shown in FIGS. 2 through 9, the first display unit 21 and the fourth display unit 32, are provided on the outer sides of the first housing 20 and the second housing 30, and the input/output devices and at least one of the speaker device, the microphone device, the camera module, and the battery pack may be disposed on the inner sides (surfaces) of the first housing 20 and the second housing 30. The input/output devices may include a display unit, a touch screen, a keypad, a keyboard, a navigation key, and QWERTY keys, in which the input devices, the speaker device, the microphone device, the camera module, and the battery pack are not shown.

In another exemplary embodiment, as shown in FIGS. 3 through 9, the second display unit 22 and the third display unit 31 are provided on the inner sides of the first housing 20 and the second housing 30 and on the outer sides of the first housing 20 and the second housing 30, are provided the input/output devices, which provide access to at least one of the speaker device, the microphone device, the camera module, and the battery pack. The input/output devices may include a display unit, a touch screen, a keypad, a keyboard, a navigation key, and QWERTY keys, in which the input devices, the speaker device, the microphone device, the camera module, and the battery pack are not shown.

In another exemplary embodiment, as shown in FIGS. 3 through 9, the second display unit 22 and the third display unit 31 are provided on the inner sides of the first housing 20 and the second housing 30. The first display unit 21 is disposed on the outer side of the first housing 20, and the input/output devices and at least one of the speaker device, the microphone device, the camera module, and the battery pack are disposed on the outer side of the second housing 30. The input/output devices may include a display unit, a touch screen, a keypad, a keyboard, a navigation key, and QWERTY keys, in which the input devices, the speaker device, the microphone device, the camera module, and the battery pack are not shown.

In another exemplary embodiment, as shown in FIGS. 3 through 9, the first display unit 21 and the fourth display unit 32 are provided on the outer sides of the first housing 20 and the second housing 30. The second display unit 22 is disposed on the inner side of the first housing 20. The input/output devices and at least one of the speaker device, the microphone device, the camera module, and the battery pack are disposed on the inner side of the second housing 30. The input/output devices may include a display unit, a touch screen, a keypad, a keyboard, a navigation key, and QWERTY keys, in which the input devices, the speaker device, the microphone device, the camera module, and the battery pack are not shown.

The first display unit 21, the second display unit 22, the third display unit 31, and the fourth display unit 32 may include touch screens or other input/output devices (not shown) that allow user to interact with the device.

Figure 5:
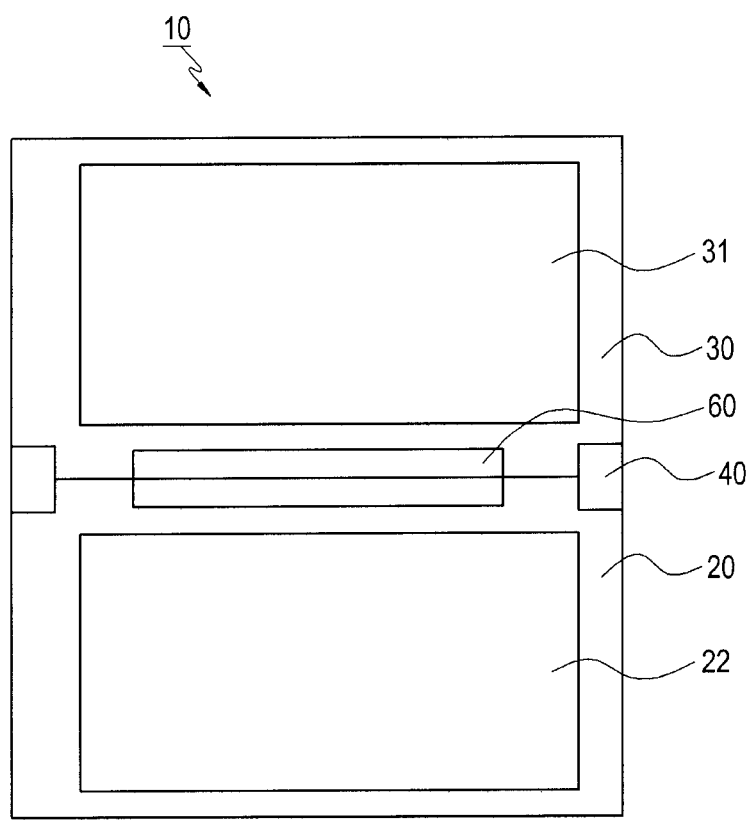
FIG. 5 is a front view of a portable communication device according to an exemplary embodiment of the present invention.
Figure 8:
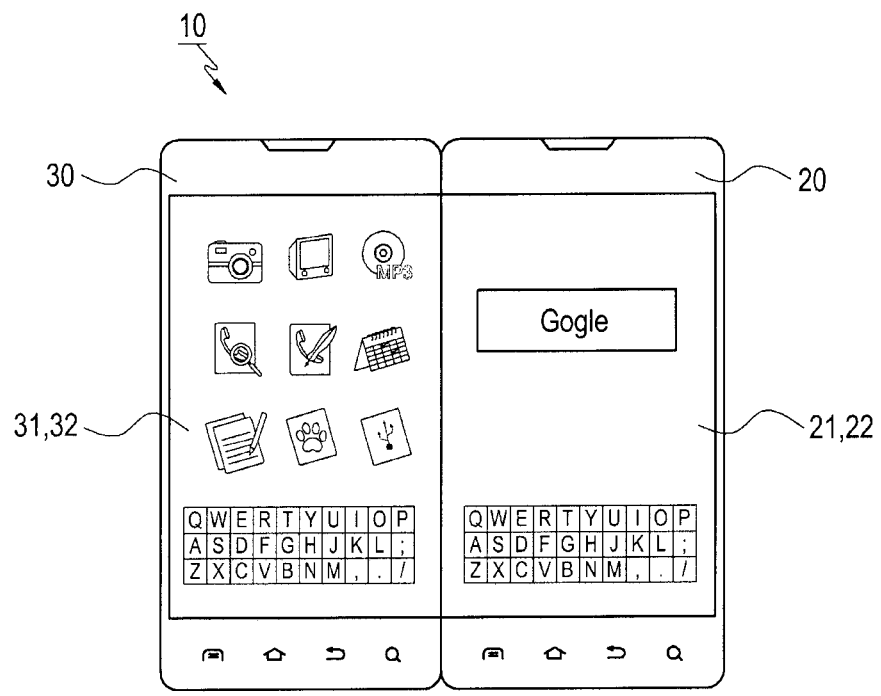
FIG. 8 is a front view showing use states of a first display unit according to an exemplary embodiment of the present invention.
Figure 9:
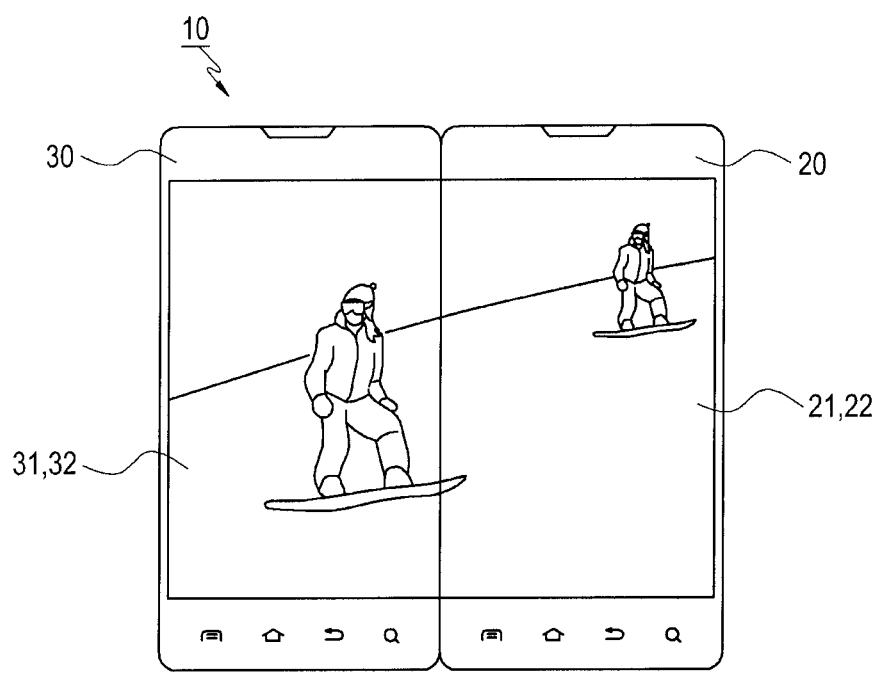
FIG. 9 is a front view showing a state where an exemplary display units in a portable communication including a first housing and a second housing used together according to an exemplary embodiment of the present invention.

As shown in FIGS. 5, 8 and 9, the first display unit 21, the second display unit 22, the third display unit 31, and the fourth display unit 32 may present different screens. For example, the first display unit 21 and the second display unit 22 present a chatting window, and the third display unit 23 and the fourth display unit 32 displays an Internet window. However, it would be recognized that other presentations, such as multimedia, pictures, moving pictures, and games other than the Internet window or chanting window, may also be displayed without altering the scope of the invention.

As shown in FIGS. 5, 8 and 9, the first display unit 21 and the fourth display unit 32, and the second display unit 22 and the third display unit 31 may be combined to form large-size screens to facilitate watching of pictures and moving pictures. In this case, the image processing software, which may be controlled by a processing unit (not shown) may control the presented image such that the presented image is displayed on two display units as a single image. As would be recognized, the processing unit may include a memory, which includes software, that when accessed by the processing unit causes the processing unit to drive the hardware components to present images on each of the screens, individually or in combination.

As shown in FIGS. 6 and 7, the first housing 20 and the second housing 30, when rotated, show the first display unit 21 and the fourth display unit 32 provided on the outer sides of the first housing 20 and the second housing 30, respectively. In this exemplary illustration of the device, the first display unit 21 is positioned on the ground and is not visible and the fourth display unit 32 is viewable by the user for the display or presentation of one or more media (e.g., application icons, multimedia presentation, etc.).

The first display unit 21 and the fourth display unit 32 may display or present the same information or different information.

As shown in FIGS. 6 and 7, when the first housing 20 and the second housing 30 are rotated to form a "V" shape, the second display unit 22 and the third display unit 31, provided on the inner sides of the first housing 20 and the second housing 30, respectively, are shown and one of these displays is positioned on the ground and not visible to the user. However, the other display, e.g., the third display unit 31, is available to display a presentation (i.e., images) to the user.

The second display unit 22 and the third display unit 31 may display the same or different information.

As shown in FIG. 5, the first housing 20 and the second housing 30 are structured such that a space 60 is formed along one edge. Although, in this illustrated example, the space is shown along that lateral edge, it would be recognized that the space may be incorporated along the longitudinal edge.

The first housing 20 and the second housing 30 include a plurality of Printed Circuit Boards (PCBs) (not shown) and a plurality of battery packs (not shown) that are disposed in selected ones the first housing 20 and the second housing 30. For example, the PCBs may be included in the first housing 20 and the battery packs may be included in the second housing 30, or the PCBs and the battery packs may be included together in the first housing 20 or in the second housing 30.

Figure 10:
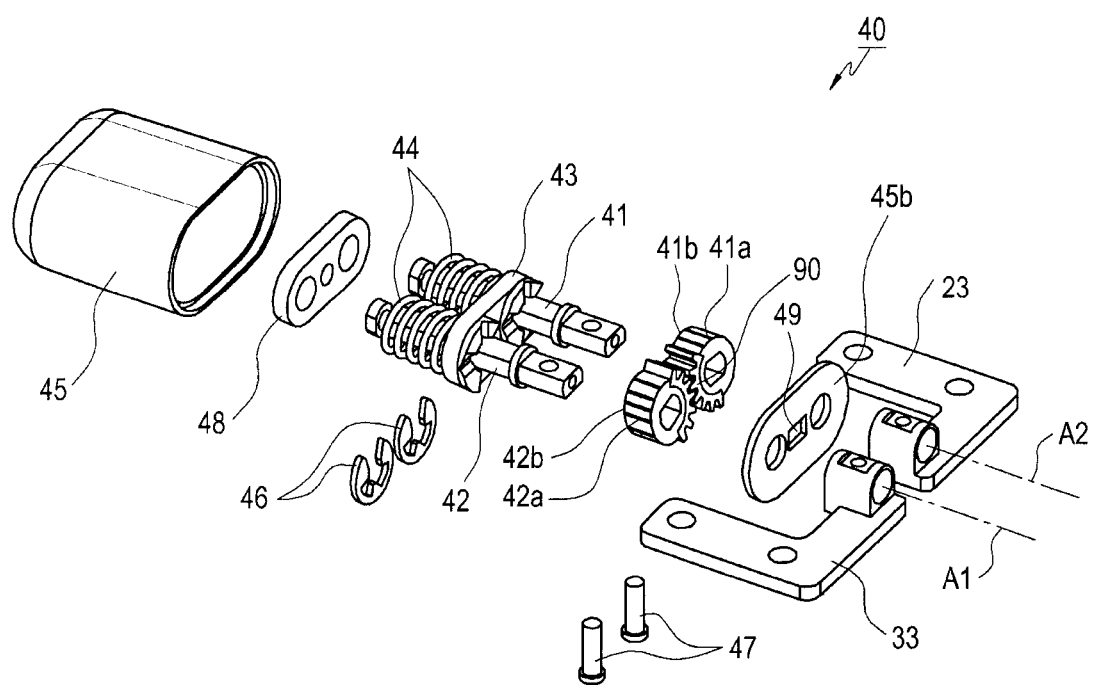
FIG. 10 is an exploded perspective view showing a hinge portion of a portable communication device according to an exemplary embodiment of the present invention.

As shown in FIGS. 1 through 10, the hinge portion 40 is a dual-axis hinge portion that includes a first hinge axis A1 and a second hinge axis A2 at both sides of the first housing 20 and the second housing 30 that allows rotation of one housing (20, 30) with respect to the other housing (30, 20). The dual-axis hinge portion 40 includes a first gear shaft 41, a second gear shaft 42, a hinge cam 43, elastic members 44, and a gear hinge housing 45 (FIG. 10). The first gear shaft 41 includes a first gear portion 41a and a first gear cam 41b such that the first gear shaft 41 is engaged with a first hinge connection portion 23 connected with the first housing 20. The second gear shaft 42 includes a second gear portion 42a rotatably engaged with the first gear portion 41a, and includes a second gear cam 42b, such that the second gear shaft 42 is engaged with a second hinge connection portion 33 connected with the second housing 30. To correspond to the first gear cam 41b and the second gear cam 42b of the first gear shaft 41 and the second gear shaft 42, the hinge cam 43 is coupled with the first gear shaft 41 and the second gear shaft 42 by allowing the first gear shaft 41 and the second gear shaft 42 to pass therethrough. To pressurize the other end portion of the hinge cam 43, elastic members 44 (springs) are coupled with the first gear shaft 41 and the second gear shaft 42 by allowing the first gear shaft 41 and the second gear shaft 42 to pass therethrough. The gear hinge housing 45 is adapted to receive the first gear shaft 41, the second gear shaft 42, the hinge cam 43, and the elastic members 44 therein.

Figure 11:
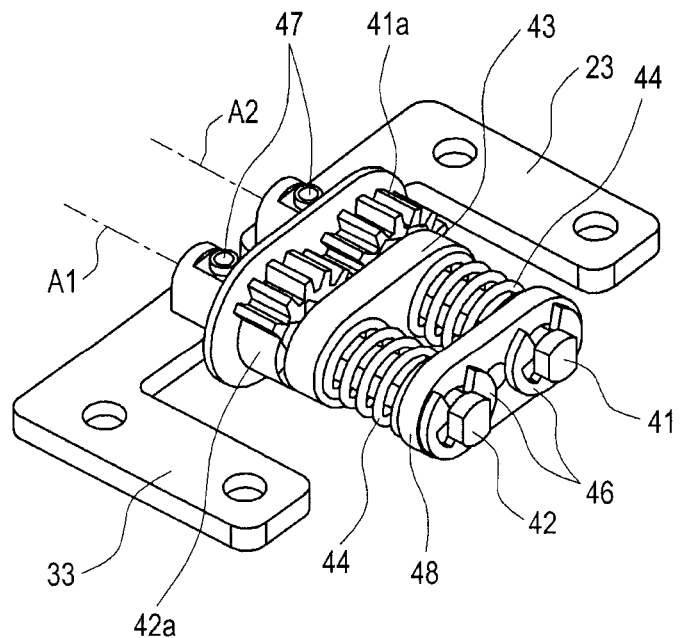
FIG. 11 is a perspective view showing a coupled state of a hinge portion of a portable communication device according to an exemplary embodiment of the present invention.
Figure 12:
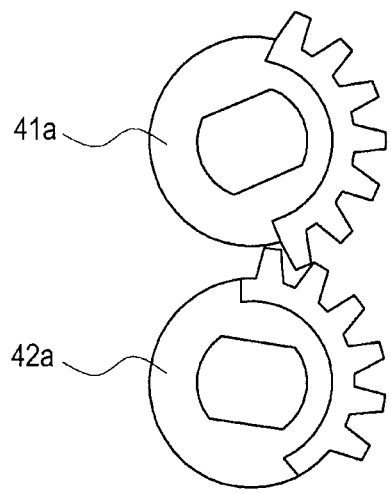
FIG. 12 is a side view showing gear cams of a hinge portion in a portable communication device according to an exemplary embodiment of the present invention.

As shown in FIGS. 10 through 12, an end portion of the first gear shaft 41 is connected by a rivet 47 with the first hinge connection portion 23 screw-engaged with the first housing 20, and another end portion of the first gear shaft 41 is engaged with an "E-ring" 46 to sequentially couple the hinge cam 43, and the elastic member 44.

As shown in FIGS. 10 through 12, an end portion of the second gear shaft 42 is connected by a rivet 47 with the second hinge connection portion 33 screw-engaged with the second housing 30, and another end portion of the second gear shaft 42 is engaged with an "E-ring" 46 to sequentially couple the hinge cam 43, and the elastic member 44.

As shown in FIG. 10, between the elastic members 44 and the E-rings 46 is provided a shaft guide portion 48 for guiding the first gear shaft 41 and the second gear shaft 42.

As shown in FIGS. 10 through 12, the gear hinge housing 45 has a housing cover 45b for closing an open side of the gear hinge housing 45. The housing cover 45b has a stopper portion 49 which contacts stopper protrusions 90 formed on the first gear cam 41b and the second gear cam 42b to restrict rotation of the dual-axis hinge portion 40.

Figure 13:
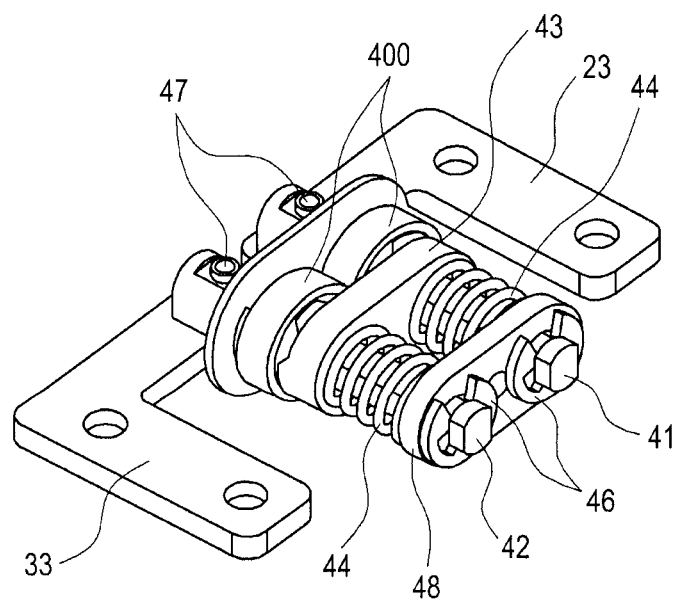
FIG. 13 is a perspective view showing an example of gear cams of a hinge portion in a portable communication device according to a second exemplary embodiment of the present invention.
Figure 14:
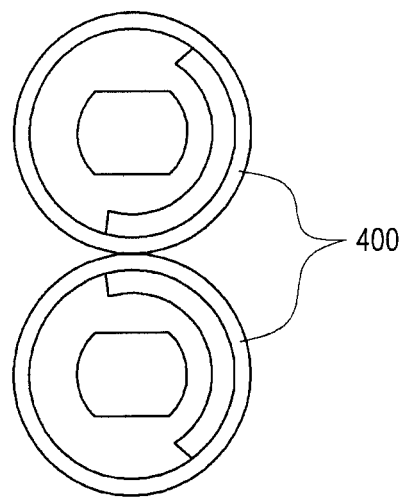
FIG. 14 is a side view showing an example of gear cams of a hinge portion in a portable communication device according to the second exemplary embodiment of the present invention.

Shown in FIGS. 13 and 14 is another example of the first gear portion 41a and the second gear portion 42a which are implemented by roller portions 400.

Figure 15:
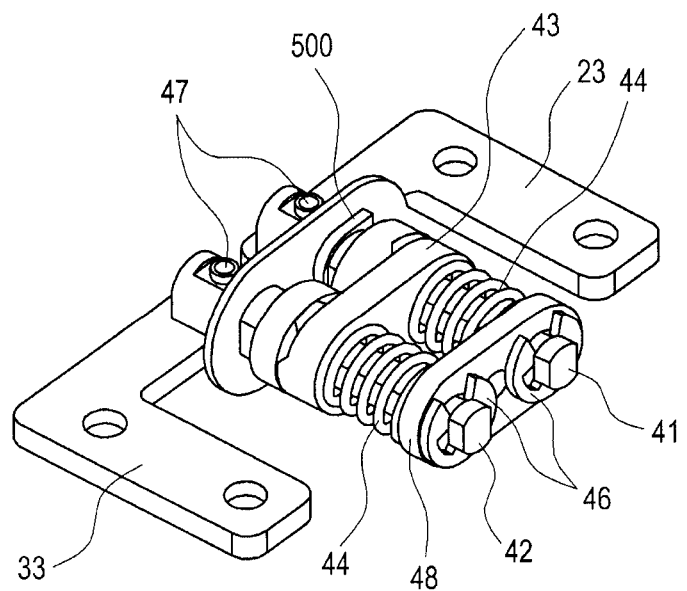
FIG. 15 is a perspective view showing an example of gear cams of a hinge portion in a portable communication device according to a third exemplary embodiment of the present invention.
Figure 16:
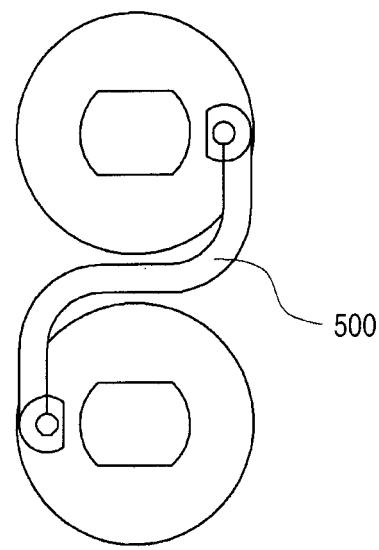
FIG. 16 is a side view showing still another example of gear cams of a hinge portion in a portable communication device according to the third exemplary embodiment of the present invention.

Shown in FIGS. 15 and 16 is another example of the first gear portion 41 and the second gear portion 42a include a link portion 500 for connecting the first gear portion 41 and the second gear portion 42a with each other and restricting rotation of the first gear portion 41 and the second gear portion 42a.

Figure 17:
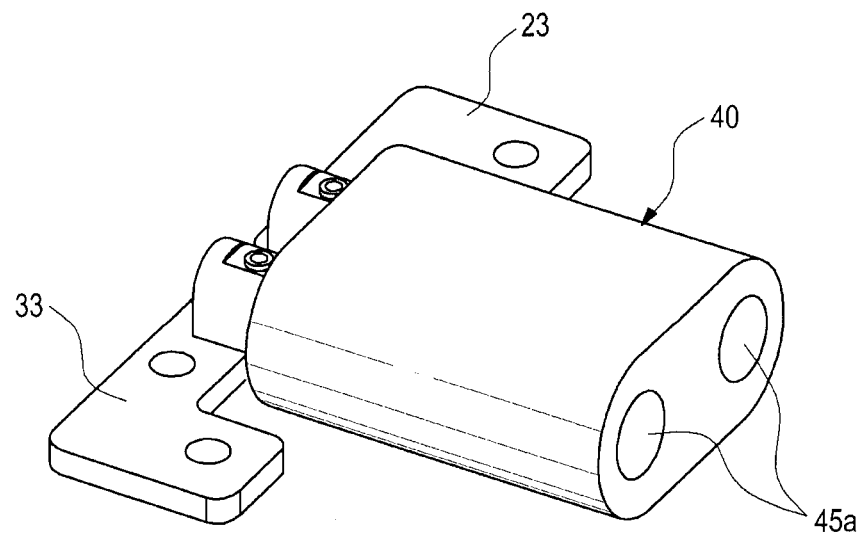
FIG. 17 is a perspective view showing arrangement holes of a hinge portion in a portable communication device according to an exemplary embodiment of the present invention.
Figure 18:
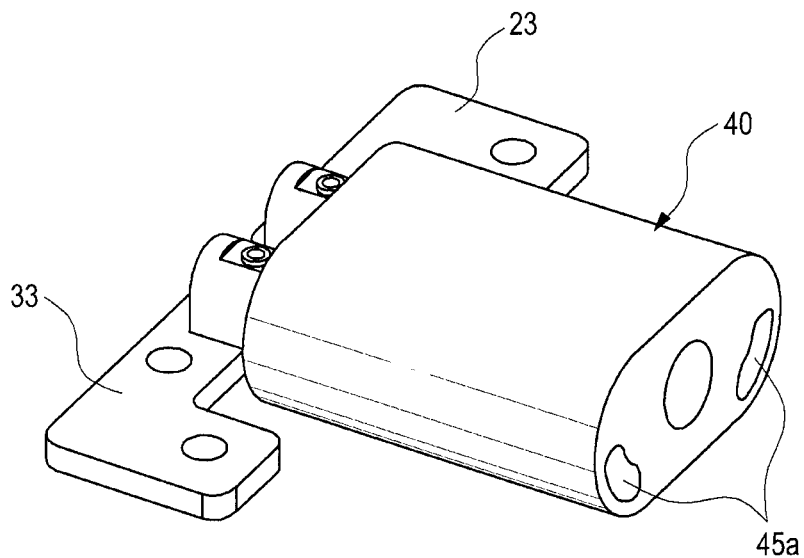
FIG. 18 is a perspective view showing a second arrangement of holes of a hinge portion in a portable communication device according to an exemplary embodiment of the present invention.

As shown in FIGS. 17 and 18, in the gear hinge housing 45 are formed at least one arrangement holes 45a for arranging a Flexible Printed Circuit Board (FPCB) (not shown) and a cable (not shown) therethrough.

Figure 19:
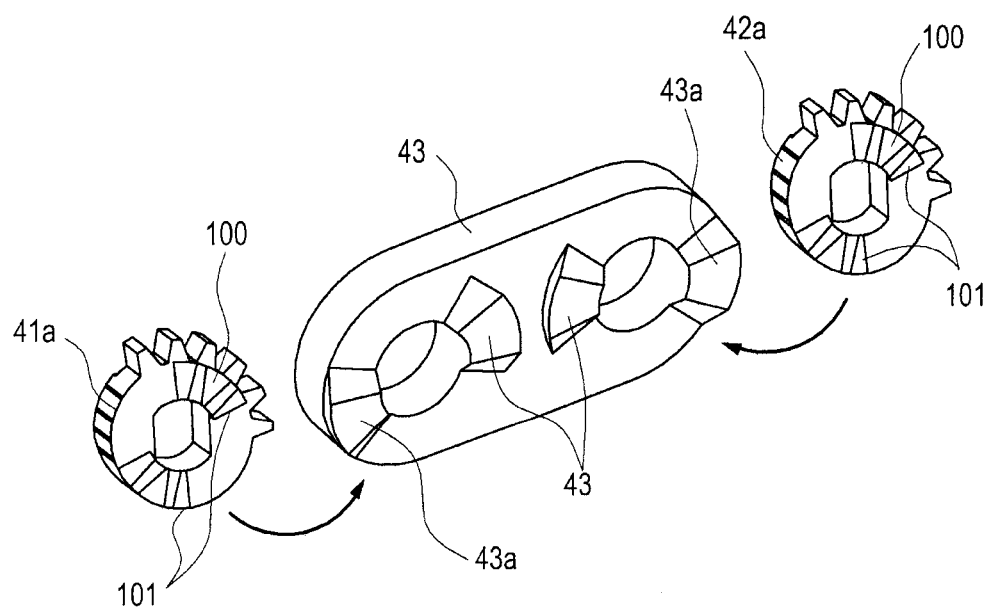
FIG. 19 is a perspective view showing gear cams and a hinge cam of a hinge portion in a portable communication device according to an exemplary embodiment of the present invention.
Figure 20:
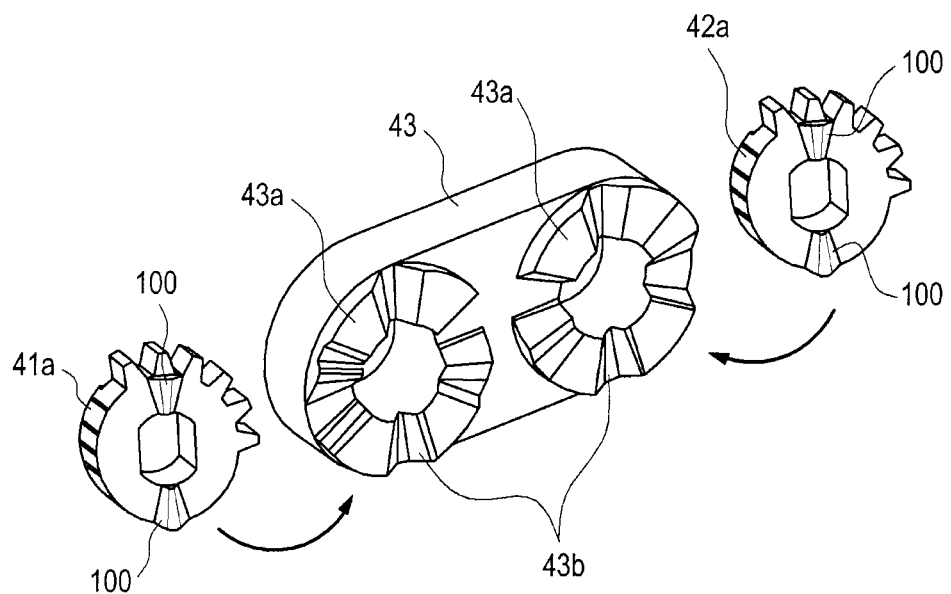
FIG. 20 is a perspective view showing exemplary additional shapes of gear cams and a hinge cam of a hinge portion in a portable communication device according to an exemplary embodiment of the present invention.
Figure 21:
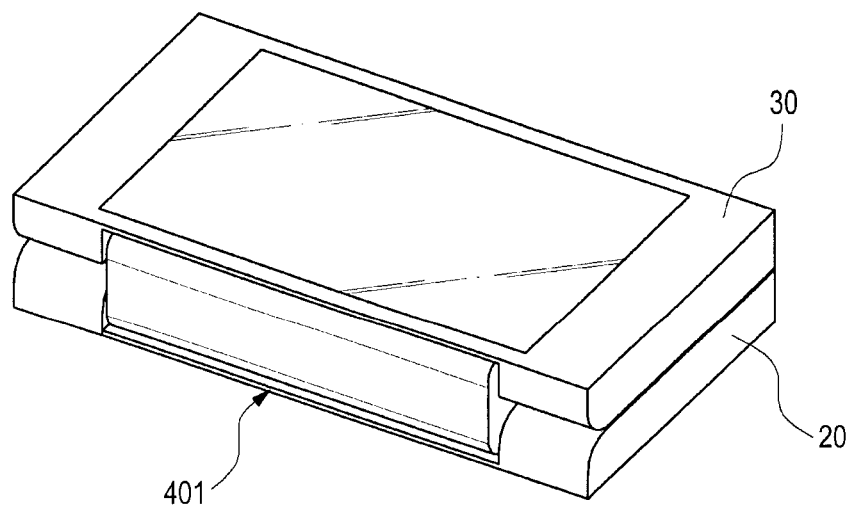
FIG. 21 is a perspective view showing a state where an integrated dual-axis hinge portion is mounted on a first housing and a second housing in a portable communication device according to an exemplary embodiment of the present invention.
Figure 22:
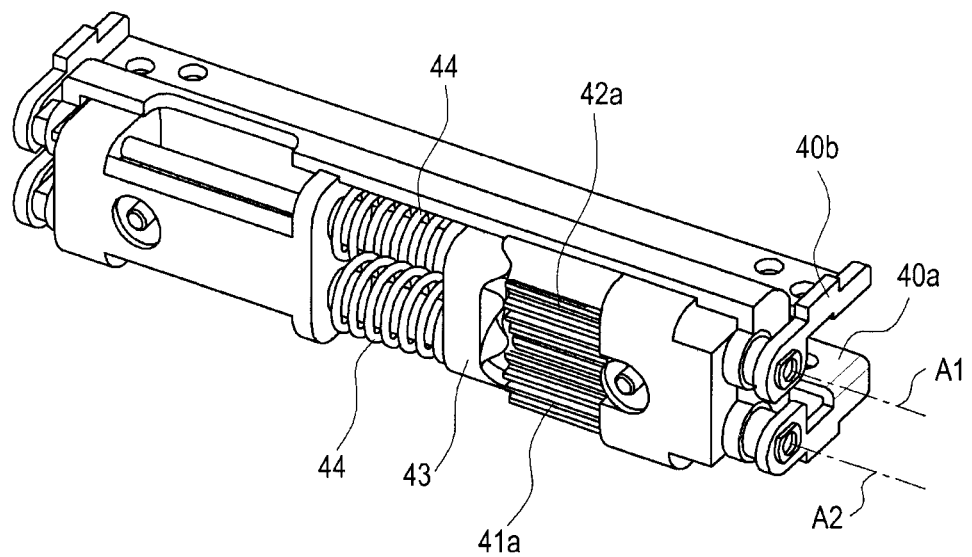
FIG. 22 is a perspective view showing a coupled state of an integrated dual-axis hinge portion in a portable communication device according to an exemplary embodiment of the present invention.
Figure 23:
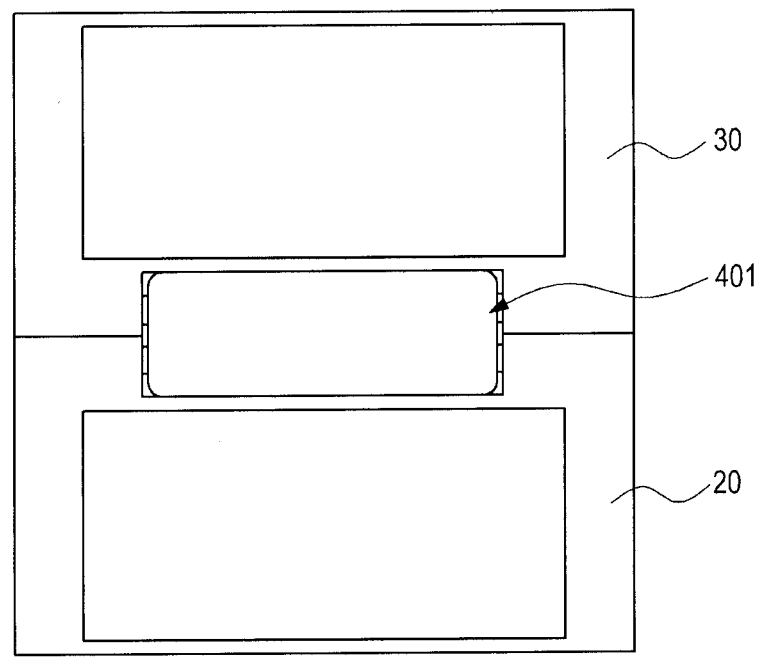
FIG. 23 is a front view showing another example of an integrated dual-axis hinge portion in a portable communication device according to an exemplary embodiment of the present invention.

As shown in FIGS. 19 and 20, in the hinge cam 43 are formed at least one male thread portions 43a and female thread portions 43b which correspond to at least one male thread portions 100 and female thread portions 101 formed the first gear cam 41a and the second gear cam 42a The dual-axis hinge portion 40 is adapted to rotate the second housing 30 stepwise 180 degrees, 360 degrees, or in a range of 0-360 degrees, and to stop the second housing 30 at a user desired angle. That is, the male and female thread portions may be selected to allow a plurality of discrete angular separations between the first housing 20 and second housings 30. Alternatively, the tread portions may be selected to provide for predetermined angular separations or may be, by friction, allow for continuous angular separation between the first housing 20 and the second housing 30.

Shown in FIGS. 21 through 24 is another example of the hinge portion 40 which is an integrated dual-axis hinge portion 401. The integrated dual-axis hinge portion 401 provides the first hinge axis A1 and the second hinge axis A2 and is provided in a center portion of the first housing 20 and the second housing 30. The integrated dual-axis hinge portion 401 is integrally connected with a first hinge connection portion 401a screw-engaged with the first housing 20 and a second hinge connection portion 401b screw-engaged with the second housing 30 to stepwise rotate the second housing 30.

Figure 24:
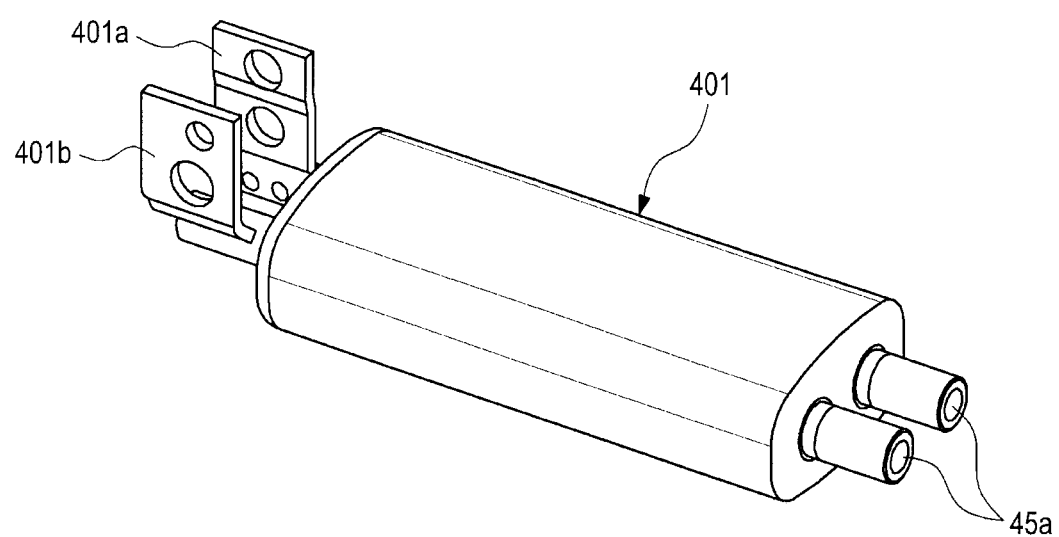
FIG. 24 is a perspective view showing another example of an integrated dual-axis hinge portion in a portable communication device according to an exemplary embodiment of the present invention.

As shown in FIG. 24, in the gear hinge housing 45 are formed at least one arrangement hole 45a for arranging an flexible PCB and a cable therethrough.

Figure 25:
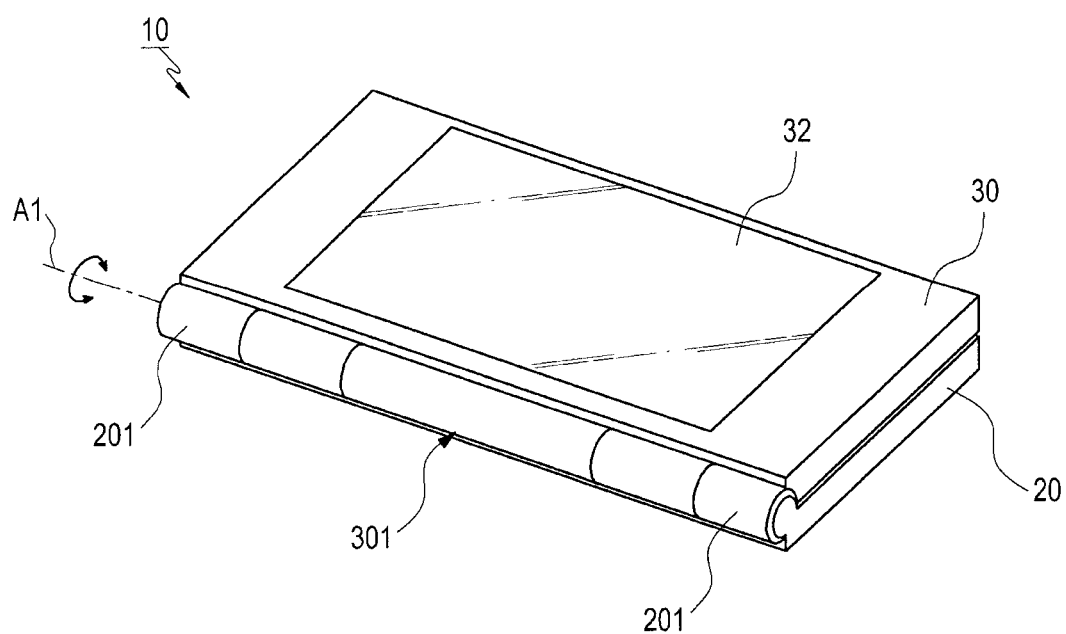
FIG. 25 is a perspective view showing another example of a hinge portion in a portable communication device according to an exemplary embodiment of the present invention.
Figure 26:
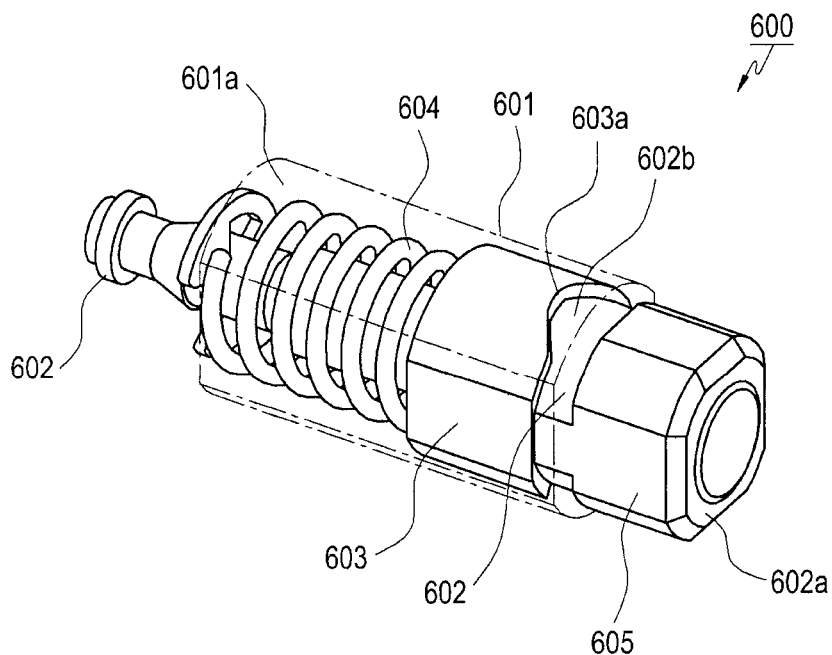
FIG. 26 is an enlarged perspective view showing another example of a hinge portion in a portable communication device according to an exemplary embodiment of the present invention.
Figure 27:
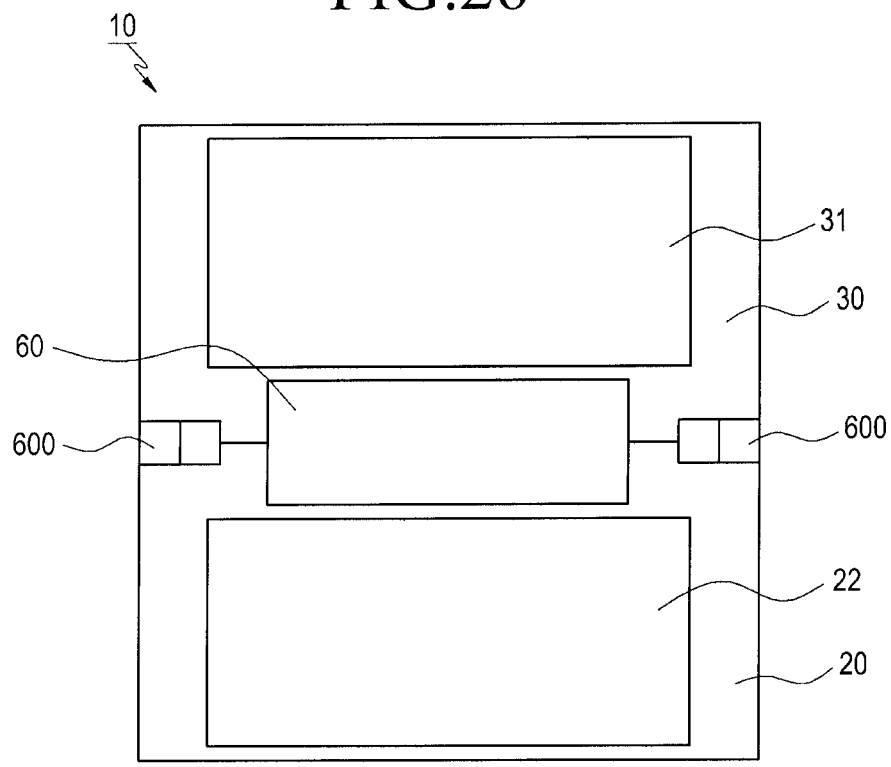
FIG. 27 is a perspective view showing an operating state of another example of a hinge portion in a portable communication device according to an exemplary embodiment of the present invention.

Shown in FIGS. 25 through 27 is still another example of the hinge portion 40 which is a hinge module 600. The hinge module 600 provides the first hinge axis A1 and is provided on one end of the first housing 20 and the second housing 30 to stepwise rotate the second housing 30. The hinge module 600 includes a hinge housing 601, a hinge shaft 602, a hinge cam 603, an elastic member 604, and a coupling cam 605. The hinge housing 601 is received in a center hinge arm 301 of the second housing 30 to form a receiving space 601a having a side that is open in a longitudinal direction and a through-hole (not shown). The hinge shaft 602 is rotatably received in an end portion of the receiving space 601a of the hinge housing 601. The hinge shaft 602 includes on an end portion thereof a hinge protrusion 602a which protrudes from outside of the hinge housing 601 through the through-hole (not shown) of the hinge housing 601 and on another end portion thereof a male thread portion 602b to correspond to a female thread portion 603a of the hinge cam 603. The hinge cam 603 is provided in the hinge housing 601 to linearly reciprocate in the receiving space 601a by rotation of the hinge shaft 602. The hinge cam 43 has on an end portion thereof the female thread portion 603a to correspond to the male thread portion 602b. The elastic member 604 is provided on another end portion of the hinge cam 603 to provide an elastic force for urging the hinge cam 603 and the hinge shaft 602 to closely contact with each other. The coupling cam 605 is coupled with the hinge protrusion 602a to be received in side hinge arms 201 of the first housing 20.

Figure 28:
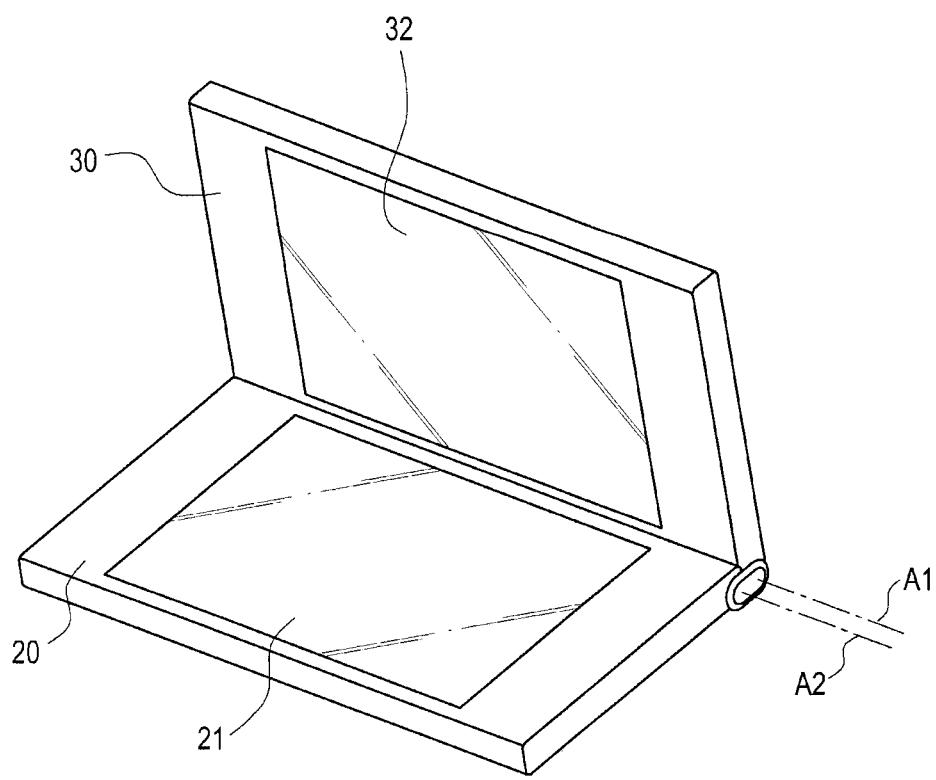
FIG. 28 is a perspective view showing a state where a first housing and a second housing are rotated to an open position according to an exemplary embodiment of the present invention.
Figure 29:
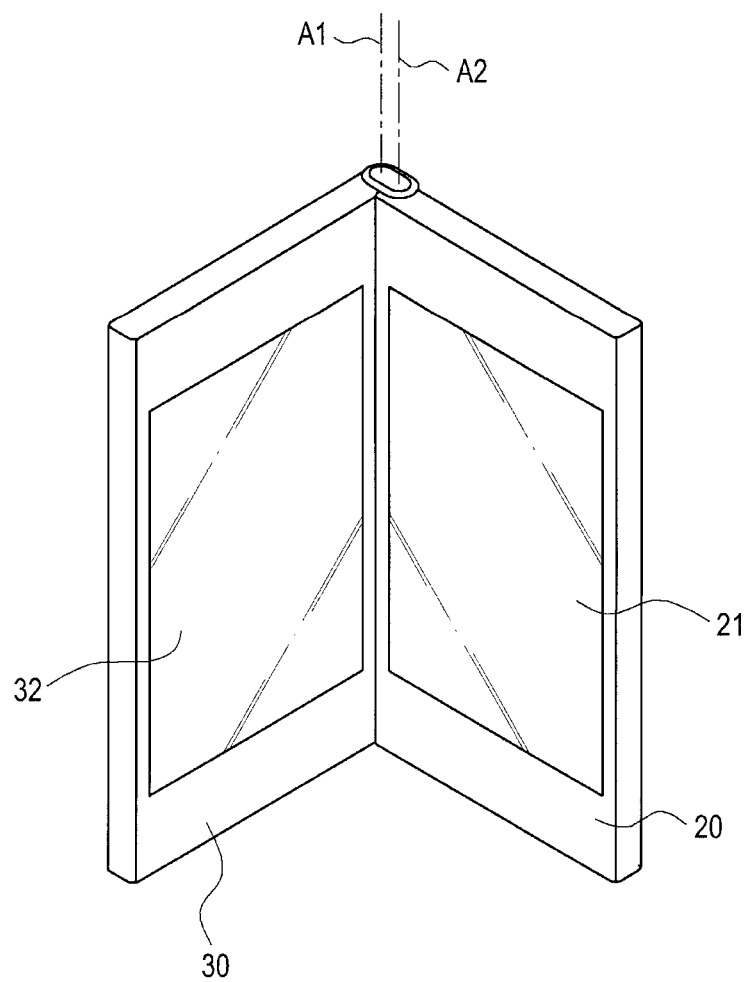
FIG. 29 is a perspective view showing a state where a first housing and a second housing are rotated to an open position according to an exemplary embodiment of the present invention.
Figure 30:
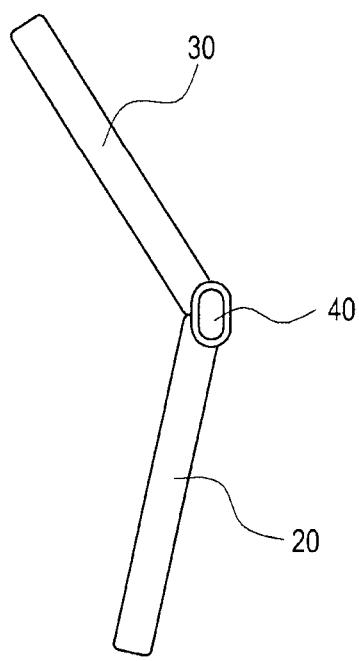
FIG. 30 is a side view showing a state where a first housing and a second housing are rotated to an open position according to an exemplary embodiment of the present invention.

As shown in FIGS. 28 through 30, when the first housing 20 and the second housing 30 rotate with respect to the first hinge axis A1 and the second hinge axis A2, the second display unit 21 of the first housing 20 and the third display unit 32 of the second housing 30 are positioned in a widthwise direction or in a longitudinal direction for display.

As shown in FIG. 29, when the first housing 20 and the second housing 30 are positioned in the longitudinal direction, a user can easily see the display while holding the portable communication device by one hand (not shown) like a book or can see the display of the first housing 20 while the second housing 30 is on the ground and used to support the device.

Portable communication devices may be generally classified into flip-type communication devices, folder-type communication devices, bar-type communication devices, and sliding-type communication devices depending on their appearance or the particular way the communication device operates. The present invention can be applied to any one of these types of communication devices.

Although a mobile communication terminal has been used as a representative example of the portable communication device according to an embodiment of the present invention, the present invention may be applied to various types of portable communication devices without being limited to a mobile communication terminal.

Examples of the portable communication device according to an embodiment of the present invention may include not only mobile communication terminals operating according to communication protocols corresponding to various communication systems, but also any information communication apparatus and/or multimedia apparatus (i.e., portable devices), such as Portable Multimedia Players (PMPs), MP3 players, digital broadcasting players, Personal Digital Assistants (PDAs), and smart phones, and so forth, and their application apparatus.

With reference to FIGS. 1 through 30, a detailed description will be made of an operating process of the portable communication device according to the an embodiment of the present invention As shown in FIGS. 1 through 20, the portable communication device 10 includes the first display unit 21 on the outer side of the first housing 20, the second display unit 22 on the inner side of the first housing 20, the fourth display unit 32 on the outer side of the second housing 30, and the third display unit 31 on the inner side of the second housing 30.

As shown in FIGS. 10 through 12, the dual-axis hinge portion 40 is provided between the first housing 20 and the second housing 30. The dual-axis hinge portion 40 includes the first gear shaft 41 including the first gear portion 41a and the first gear cam 41b, the second gear shaft 42 including the second gear portion 42a rotatably engaged with the first gear portion 41a and the second gear cam 42b, the hinge cam 43, the elastic members 44, and the gear hinge housing 45 receiving the first gear shaft 41, the second gear shaft 42, the hinge cam 43, and the elastic members 44 therein.

In this state, as shown in FIGS. 10 through 12, an end portion of the first gear shaft 41 is connected by the rivet 47 with the first hinge connection portion 23 screw-engaged with the first housing 20, and another end thereof is engaged with the E-ring 46. An end portion of the second gear shaft 42 is connected by a rivet 47 with the second hinge connection portion 33 screw-engaged with the second housing 30, and another end thereof is engaged with the e-ring 46.

Shown in FIGS. 13 and 14 is another example of the first gear portion 41a and the second gear portion 42a which are implemented by the roller portions 400.

Shown in FIGS. 14 and 15 is another example of the first gear portion 41 and the second gear portion 42a include the link portion 500 for connecting the first gear portion 41 and the second gear portion 42a with each other and restricting rotation of the first gear portion 41 and the second gear portion 42a.

As shown in FIG. 1, when the first display unit 21 and the fourth display unit 32 provided on the outer sides of the first housing 20 and the second housing 30, respectively, are used, the second housing 30 is closed by rotating toward the first housing 20 with respect to the first hinge axis A1 and the second hinge axis A2 of the dual-axis hinge portion 40. In this illustrative case, the first display unit 21 and the fourth display unit 32 are shown to be used for a communication mode and as touch screens.

Also, on the inner sides of the first housing 20 and the second housing 30 are disposed the input/output devices and at least one of the speaker device, the microphone device, the camera module, and the battery pack. The input/output devices may include a display unit, a touch screen, a keypad, a keyboard, a navigation key, and QWERTY keys, in which the input devices, the speaker device, the microphone device, the camera module, and the battery pack are not shown.

As shown in FIGS. 2 through 5, the second housing 30 rotates away from the first housing 20 along the first hinge axis A1 and the second hinge axis A2.

In this state, as shown in FIG. 5, the second display unit 22 and the third display unit 31, provided in the inner sides of the first housing 20 and the second housing 30, are also positioned in parallel and viewable, Thus, these display units are available for presentation of information to a user.

As shown in FIG. 8, the first display unit 21 and the second display unit 22 present a chatting window and the third display unit 31 and the fourth display unit 32 present an Internet window.

As shown in FIG. 9, the first display unit 21 and the fourth display unit 32 (and/or the second display unit 22 and the third display unit 31) may be used together (conjunction) to display (present) a picture and/or a moving picture on a larger-sized screen.

As shown in FIGS. 19 and 20, the first housing 20 and the second housing 30 rotate stepwise by using the male thread portion 43a and the female thread portion 43b formed in the hinge cam 43 of the dual-axis hinge portion 40 and the male thread portion 100 and the female thread portion 101 formed in the first gear cam 41b.

The dual-axis hinge portion 40 may stepwise rotate the second housing 30 by a fixed (or discrete) number of degrees (e.g., 180 degrees, 360 degrees,) or continuously in a range of 0-360 degrees. For example, the hinge portion may rotate the housing units to discrete angular position, such as 22.5, 45, 90, 135, 180 degrees, or by a fixed number of degrees, such as 10, 15, 20, 25 . . . etc.

As shown in FIGS. 6 and 7, the first housing 20 and the second housing 30 rotate, and in this state, the first housing 20 and the second housing 30 are inclined and display a picture and a moving picture by using the first display unit 21 and the fourth display unit 32 of the first housing 20 and the second housing 30.

In addition, as shown in FIGS. 6 and 7, the included first display unit 21 and fourth display unit 32 present a picture, a calendar, a clock, weather, and the like. The first display unit 21 and the fourth display unit 32 may display the same screen or different screens.

As shown in FIG. 7, the first display unit 21 closely contacts a surface that supports the device and in this state, the fourth display unit 32 is used the display screen.

As shown in FIG. 5, once the first housing 20 and the second housing 30 are open by rotating around the first hinge axis A1 and the second hinge axis A2, the space 60 is formed between the first housing 20 and the second housing 30 and the input/output devices and at least one of the display unit, the speaker device, the microphone device, the camera module, and the battery pack are disposed in the space 60.

Shown in FIGS. 21 through 24 is another example of the hinge portion 40 which is an integrated dual-axis hinge module. The integrated dual-axis hinge portion 40 provides the first hinge axis A1 and the second hinge axis A2 and is provided in the center portion of the first housing 20 and the second housing 30. The integrated dual-axis hinge portion 40 is integrally connected with the first hinge connection portion 401a screw-engaged with the first housing 20 and the second hinge connection portion 401b screw-engaged with the second housing 30 to stepwise rotate the second housing 30.

Shown in FIGS. 25 through 27 is still another example of the hinge portion 40 which is the hinge module 600. The hinge module 600 provides the first hinge axis A1 and is provided on one end of the first housing 20 and the second housing 30 to rotate the second housing 30 with respect to the first housing 20.

As such, the first display unit 21, and the fourth display unit 32 provided on the outer sides s of the first housing 20 and the second housing 30 are used in a closed state of the portable communication device. In an open state, the second display unit 22 and the third display unit 31, provided on the inner sides of the first housing 20 and the second housing 30, are positioned in parallel and may be used as a large-size screen. In addition, the respective display units 21, 22, 31, and 32 may display different images. For example, a display unit of the first housing 20 may display a chatting window and the other display unit of the second housing 30 may display an Internet window.

As shown in FIGS. 28 through 30, when the first housing 20 and the second housing 30 rotate around the first hinge axis A1 and the second hinge axis A2, the second display unit 22 and the third display unit 31 of the first housing 20 and the second housing 30 are positioned in a widthwise direction or in a longitudinal direction. Consequently, the user can conveniently view screens of the second display unit 22 and the third display unit 31.

As shown in FIG. 29, when the first housing 20 and the second housing 30 are positioned in the longitudinal direction, the user can easily see the display while holding the portable communication device by one hand (not shown) like a book or can see the display by cradling the first housing 20 and the second housing 30 on the ground, thus improving the use efficiency of a product.

It will be obvious to those of ordinary skill in the art that a portable communication device according to the present invention described above is not limited by the foregoing embodiment and drawings, and various substitutions, modifications, and changes can be made.

What is claimed is:
1. A portable communication device comprising:
a first housing;
a second housing rotatably coupled with the first housing; and
a hinge portion provided between the first housing and the second housing to stepwise rotate the second housing with respect to the first housing, wherein rotation of the first housing and the second housing occurs around a first hinge axis or a second hinge axis;
a pair of gear hinge housings, each one gear hinge housing respectively arranged longitudinally at an opposite ends of the first housing and second housing, in which each one gear hinge housing is axially aligned with a respective first gear shaft, a second gear shaft, a hinge cam, and a plurality of elastic members, and each one housing completely receives the first gear shaft, the second gear shaft, the hinge cam and the plurality of elastic members;
wherein display units are disposed on outer sides of the first housing and the second housing, respectively, said display units operating separately or in conjunction to form a single large screen,
wherein the hinge portion comprises a first hinge portion positioned on one end of the first housing and the second housing, and a second hinge portion positioned on another end of the first housing and the second housing, and
wherein the display units are disposed between the first hinge portion and the second hinge portion,
and
wherein a space is comprised between a pair of gear hinge housings,
input/output devices and at least one of a speaker device, a microphone device, a camera module, and a battery pack are disposed in the space, and
the input/output devices comprise at least one of a display unit, a touch screen, a keypad, a keyboard, a navigation key, and QWERTY keys.

2. The portable communication device of claim 1, wherein input/output devices are disposed on inner sides of the first housing and the second housing.

3. A portable communication device comprising: a first housing comprising a first display unit and a second display unit provided on an outer side and an inner side, respectively, of the first housing; a second housing comprising a third display unit and a fourth display unit provided on one of an inner side and an outer side, respectively, of the second housing and a hinge portion provided between the first housing and the second housing to stepwise rotate the second housing with respect to the first housing wherein rotation of the first housing and the second housing occurs around a first hinge axis and a second hinge axis, a pair of gear hinge housings, each one gear hinge housing respectively arranged longitudinally at an opposite end of the first housing and second housing, in which each one gear hinge housing is axially aligned with a respective first gear shaft, a second gear shaft, a hinge cam, and a plurality of elastic members, and each one housing completely receives the first gear shaft, the second gear shaft, the hinge cam and the plurality of elastic members; wherein the hinge portion comprises a first hinge portion positioned on one end of the first housing and the second housing, and a second hinge portion positioned on another end of the first housing and the second housing, and wherein the first display unit and the third display unit and/or the second display unit and the fourth display unit are disposed between the first hinge portion and the second hinge portion, wherein the first housing and the second housing, when in a closed state show the first display unit and the fourth display unit provided on the outer sides of the first housing and the second housing, respectively, the first housing and the second housing, when in an open state show the first display unit, the second display unit, the third display unit, and the fourth display unit, the first display unit and the fourth display unit, and the third display unit, and the second display unit being positioned in parallel, and the first housing and the second housing, when rotated to a position between the open state and the closed state selectively show the first display unit and the fourth display unit or the second display unit and the third display unit, and wherein the first housing and the second housing comprises a space between the first hinge portion and the second hinge portion; input/output devices and at least one of a speaker device, a microphone device, a camera module, and a battery pack are disposed in the space, and the input/output devices comprise at least one of a display unit, a touch screen, a keypad, a keyboard, a navigation key, and QWERTY keys.

4. The portable communication device of claim 3, wherein the first display unit and the fourth display unit are provided on the outer sides of the first housing and the second housing, respectively.

5. The portable communication device of claim 3, wherein the second display unit and the third display unit are provided on the inner sides of the first housing and the second housing, respectively.

6. The portable communication device of claim 3, wherein the first display unit and the fourth display unit are provided on the outer sides of the first housing and the second housing, respectively, the second display unit is provided on the inner side of the first housing.

7. The portable communication device of claim 3, wherein the second display unit and the third display unit are provided on the inner sides of the first housing and the second housing, respectively, the first display unit is provided on the outer side of the first housing.

8. The portable communication device of claim 3, wherein the first display unit, the second display unit, the third display unit, and the fourth display unit comprise at least one of: touch screens or input/output devices.

9. The portable communication device of claim 3, wherein the first display unit and the fourth display unit, and the second display unit and the third display unit are used together as a large-size screen.

10. The portable communication device of claim 3, wherein
the first display unit and the fourth display unit display a same screen or different screens, and the second display unit and the third display unit display the same screen or different screens.

11. The portable communication device of claim 3, wherein the first housing and the second housing comprise a plurality of Printed Circuit Boards (PCBs) and a plurality of battery packs which are selectively disposed on the first housing and the second housing.

12. The portable communication device of claim 3, wherein the hinge portion comprises a dual-axis hinge portion that provides the first hinge axis and the second hinge axis on both sides of the first housing and the second housing to rotate the second housing with respect to the first housing.

13. The portable communication device of claim 12, wherein the dual-axis hinge portion comprises:
the first gear shaft comprising a first gear portion and a first gear cam, the first gear shaft being engaged with a first hinge connection portion connected with the first housing;
the second gear shaft comprising a second gear portion rotatably engaged with the first gear portion, and a second gear cam, the second gear shaft being engaged with a second hinge connection portion connected with the second housing;
the hinge cam is coupled with the first gear shaft and the second gear shaft by allowing the first gear shaft and the second gear shaft to pass therethrough, to correspond to the first gear cam and the second gear cam of the first gear shaft and the second gear shaft;
the elastic members are coupled with the first gear shaft and the second gear shaft wherein the first gear shaft and the second gear shaft pass through the elastic members, the elastic member providing a pressure to another end portion of the hinge cam; and
each gear hinge housing receives the first gear shaft, the second gear shaft, the hinge cam, and the elastic members.

14. The portable communication device of claim 13, wherein an end portion of the first gear shaft is connected by a rivet by the first hinge connection portion being screw-coupled with the first housing and another end thereof is engaged with an E-ring.

15. The portable communication device of claim 13, wherein an end portion of the second gear shaft is connected by a rivet by the second hinge connection portion being screw-coupled with the second housing and another end thereof is engaged with an E-ring.

16. The portable communication device of claim 13, wherein the first gear shaft and the second gear shaft comprise a shaft guide portion for guiding the first gear shaft and the second gear shaft between the elastic members and E-rings.

17. The portable communication device of claim 13, wherein the gear hinge housing comprises at least one arrangement hole for passing a Flexible Printed Circuit Board (FPCB) and a cable therethrough.

18. The portable communication device of claim 13, wherein the gear hinge housing comprises a housing cover which comprises a stopper portion that contacts stopper protrusions formed on the first gear cam and the second gear cam to restrict rotation of the dual-axis hinge portion.

19. The portable communication device of claim 13, wherein the hinge cam comprises at least one male thread portion and female thread portion which correspond to at least one male thread portion wherein the corresponding female thread portion is formed in the first gear cam and the second gear cam to allow rotation of the second housing.

20. The portable communication device of claim 12, wherein the dual-axis hinge portion stepwise rotate the second housing by a discrete number of degrees.

* * * * *

UNITED STATES PATENT AND TRADEMARK OFFICE
CERTIFICATE OF CORRECTION

PATENT NO.       : 9,274,552 B2
APPLICATION NO.  : 13/279773
DATED            : March 1, 2016
INVENTOR(S)      : Sung-Ho Ahn et al.

Page 1 of 1

It is certified that error appears in the above-identified patent and that said Letters Patent is hereby corrected as shown below:

Claims

Column 12, Claim 1, Lines 9-10 should read as follows:
--...opposite end of the...--

Signed and Sealed this
Third Day of May, 2016

Michelle K. Lee
*Director of the United States Patent and Trademark Office*